US009320255B2

(12) United States Patent
Spadon

(10) Patent No.: US 9,320,255 B2
(45) Date of Patent: Apr. 26, 2016

(54) PRESSING EQUIPMENT FOR THE PRODUCTION OF MOZZARELLA HAVING SUBSTANTIALLY BIDIMENSIONAL GEOMETRY

(71) Applicant: GRANAROLO S.P.A., Bologna (BO) (IT)

(72) Inventor: Fabrizio Spadon, Bologna (IT)

(73) Assignee: GRANAROLO S.P.A., Bologna (IT)

( * ) Notice: Subject to any disclaimer, the term of this patent is extended or adjusted under 35 U.S.C. 154(b) by 0 days.

(21) Appl. No.: 14/293,439

(22) Filed: Jun. 2, 2014

(65) Prior Publication Data

US 2014/0314914 A1 Oct. 23, 2014

Related U.S. Application Data

(63) Continuation of application No. 14/123,611, filed as application No. PCT/IB2012/052846 on Jun. 6, 2012, now abandoned.

(30) Foreign Application Priority Data

Jun. 6, 2011 (IT) .............................. MI2011A1012

(51) Int. Cl.
*A01J 27/00* (2006.01)
*A01J 25/15* (2006.01)

(52) U.S. Cl.
CPC . *A01J 27/00* (2013.01); *A01J 25/15* (2013.01)

(58) Field of Classification Search
CPC .................................. A01J 27/00; A01J 25/15
See application file for complete search history.

(56) References Cited

U.S. PATENT DOCUMENTS 2,879,593 A * 3/1959 Schwartz ................ A01J 25/12
425/289
4,116,119 A * 9/1978 Kuhlman ................. A21B 5/02
99/450.6

(Continued)

FOREIGN PATENT DOCUMENTS

DE 10141914 * 8/2002
EP 1295530 3/2003

(Continued)

OTHER PUBLICATIONS

English Translation for EP1295530 published Mar. 2003.*

(Continued)

*Primary Examiner* — Anthony Weier
(74) *Attorney, Agent, or Firm* — Lucas & Mercanti, LLP.

(57) ABSTRACT

Press machine for producing mozzarellas having a substantially two-dimensional geometry, having a station for sorting preformed balls of mozzarella and obtained with a milk-based paste and a press station for shaping said preformed mozzarella balls in pieces of mozzarella having a substantially two-dimensional geometry, said press station having an alveolar plane defining at least one alveolar seat suitable for at least one of said preformed balls of mozzarella and coming from said sorting station, also having at least one pressing element that is mobile between a resting position, wherein said pressing element is located distant from said alveolar plane for arranging said preformed ball of mozzarella in said alveolar seat, and a pressing position, wherein said pressing element is located above said alveolar seat for pressing said preformed ball of mozzarella. Furthermore, a production process using the above press machine for producing mozzarella having a substantially two-dimensional geometry.

7 Claims, 9 Drawing Sheets

(56) References Cited

U.S. PATENT DOCUMENTS

| | | | |
|---|---|---|---|
| 4,248,578 A | | 2/1981 | Worden |
| 4,696,823 A | * | 9/1987 | DeChristopher ...... A21C 11/02 426/496 |
| 5,231,919 A | * | 8/1993 | Lawrence ............... B65G 43/00 100/222 |
| 6,015,584 A | * | 1/2000 | Lawrence ................ A21C 9/08 425/364 R |
| 6,319,526 B1 | | 11/2001 | Dahlstrom et al. |
| 7,669,527 B2 | * | 3/2010 | Schultz ................ A21C 11/006 100/178 |
| 8,784,918 B2 | * | 7/2014 | Arevalo ................. G01N 33/10 198/605 |
| 2004/0156966 A1 | * | 8/2004 | Berger ..................... B26D 3/24 426/518 |
| 2011/0256281 A1 | * | 10/2011 | Johnson .................. A01J 27/04 426/289 |

FOREIGN PATENT DOCUMENTS

| | | | |
|---|---|---|---|
| GB | 924212 | * | 4/1963 |
| NL | 9200533 | * | 10/1993 |
| SU | 569301 | * | 10/1977 |

OTHER PUBLICATIONS

English Translation for DE 10141914 published Aug. 2002.*
Mintel, Heart shaped mozzarella cheese, XP002684993, published May 2005.
Mintel, Cherry-sized mozzarella balls, XP002667372, published May 2011.
International Search Report issued in counterpart PCT Application No. PCT/IB2012/052846, published Oct. 2012.
Written Opinion of International Searching Authority issued in counterpart PCT Application No. PCT/IB2012/052846, published Oct. 2012.

* cited by examiner

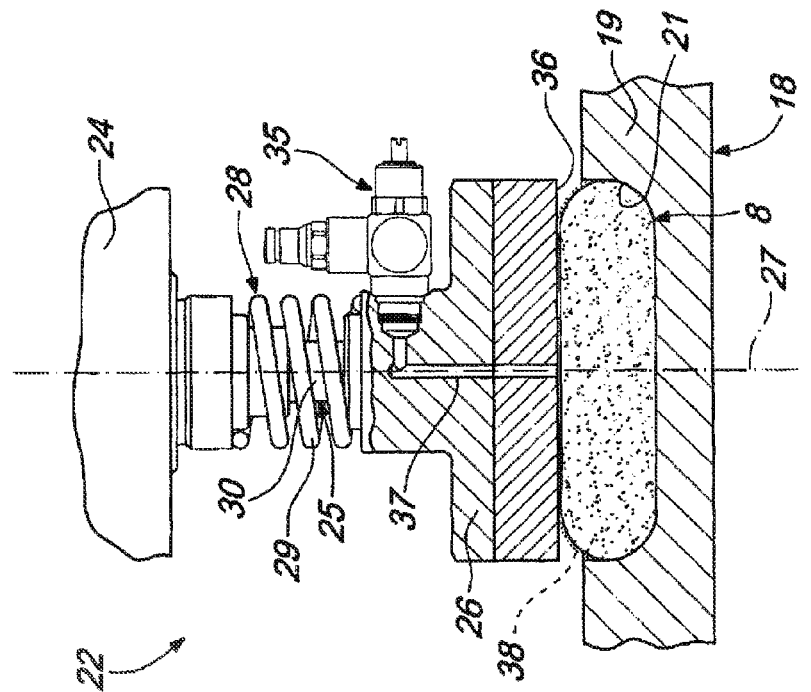
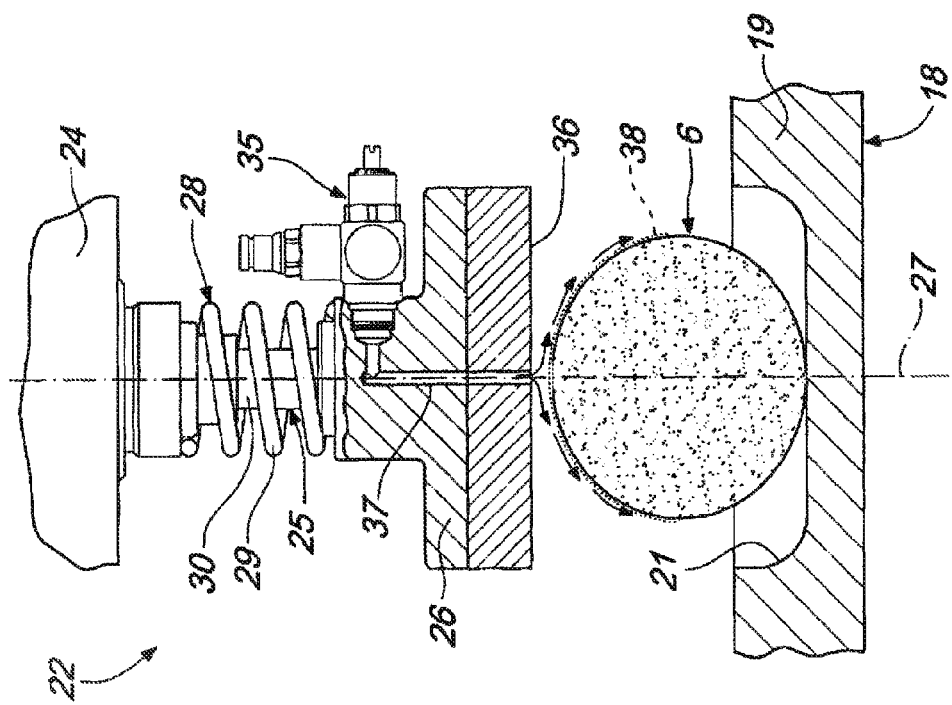

PRESSING EQUIPMENT FOR THE PRODUCTION OF MOZZARELLA HAVING SUBSTANTIALLY BIDIMENSIONAL GEOMETRY

CROSS-REFERENCE TO RELATED APPLICATIONS

This application is a continuation of U.S. application Ser. No. 14/123,611, filed on Dec. 3, 2013, now abandoned, which is a U.S. National Stage of PCT/IB2012/052846 filed on Jun. 6, 2012, which claims priority to and the benefit of Italian Application No. MI2011A001012 filed on Jun. 6, 2011, the contents of which are incorporated herein by reference in their entirety.

FIELD OF THE INVENTION

The present invention concerns a press machine for producing mozzarellas having a substantially two-dimensional geometry.

STATE OF THE ART

Nowadays, the food industry offers a wide variety of food products suitable for the most different culinary applications.

Amongst these dairy products are known, such as mozzarellas and cheeses, in general, which are used for preparing hot dishes, such a pizza and the like, for preparing cold dishes, such as tomato and mozzarella salads (caprese) and the like, a well as for preparing "take away" products, such as panini, piadina or focaccia and the like.

Advantageously, for the preparation of these "take away" products, which as already mentioned substantially consist of panini, piadina or focaccia and the like, the milk product, which generally has a substantially spherical shape and thus unsuitable for being inserted in the is cut into slices so as to be able to distribute it in an even manner inside the panini which, as often occurs, is not consumed immediately, but at a later moment after it has been displayed in a window, if for example it is intended to be sold to the public, or after being stored in backpacks or portable coolers, in the case for example it is used as a packed lunch for outings, picnics and the like.

The aforementioned uses are not without drawbacks including the fact that, if the mozzarella or cheese is of the fresh type, i.e. having a succulent inner structure enclosed by an outer film, cutting the milk product involves breaking this outer film with the juices and internal aromas inevitably coming out.

Of course, this coming out of liquid leads to considerable inconveniences such as, for example, the soaking of the two slices of bread forming the panini, the soaking of the inner lining of the back pack used for transporting the packed lunch, the wetting of all the objects or food products surrounding the panini, whether it be located in windows or in refrigerators, as well as the wetting of the worktop where the panini itself is prepared.

As can be easily gathered, what has been described does not represent only an inconvenience for the consumer/maker of the panini, but represents a condition of poor hygiene since the inner juices of the cheese, once they have come out, if they are not promptly cleaned, can lead over time to bacteria colonies or mould generating bad smells such as to attract insects and animals in general, without considering also the unavoidable loss of the classic fragrance which fresh mozzarella and fresh cheeses in general have.

In order to avoid such drawbacks, in order to make these "take away" products "dry" cheeses can be used, i.e. not having a succulent inner structure, which however do not have the flavour and the quality that a fresh cheese can have.

The main task of the present finding consists in devising a production process of dairy products, particularly of mozzarellas and the like, which makes it possible to obtain a food product derived from milk, which has a succulent inner structure enclosed by an outer film and that has a geometrical shape that is suitable for being used in the preparation of "take away" products previously described, avoiding and overcoming the drawbacks and the limitations of the prior art, respectively.

In this task, one purpose of the present finding consists of making a food product derived from milk that does not require being cut to be used in the preparation of "take away" products.

The task outlined above, as well as the purposes mentioned and others that shall become clearer in the rest of the description, are achieved, with a mozzarella characterised in that it has a substantially two-dimensional geometry, which can be obtained with an industrial process of dairy products.

This type of mozzarella is obtained with a process for preparing dairy products, particularly mozzarellas and the like, which is characterised in that it comprises at least one step of pressing preformed balls of mozzarella paste and obtained with a milk-based paste for shaping pieces of mozzarella having a substantially two-dimensional geometry, for example disc-shaped. Subsequently to said at least one pressing step, at least one hardening step of said pieces of mozzarella having a substantially two-dimensional geometry, in particular disc-shaped, is foreseen to form on them an outer film suitable for holding the internal juices and aroma, thus obtaining a mozzarella paste having a substantially two-dimensional geometry, for example disc-shaped.

In particular this process is characterised in that the pressing step is carried out by using the press machine object of the present invention.

Indeed, the object of the present invention is a press machine as claimed in claims 1-8 attached to the present description.

This press machine in particular comprises: a station for sorting preformed balls of mozzarella and obtained with a milk-based paste and a press station: for shaping said preformed mozzarella balls in mozzarella balls having a substantially two-dimensional geometry, for example disc-shaped.

The pressing station, in turn, comprises an alveolar plane, defining at least one alveolar seat, suitable for containing at least one of said preformed balls of mozzarella paste and coming from said sorting station, and at least one pressing element that is mobile between a resting position, in which said pressing element is located distant from said alveolar plane, for arranging said preformed ball of mozzarella in said alveolar seat, and a pressing position, in which said pressing element is located on top of said alveolar seat for pressing said preformed ball of mozzarella.

Further characteristics and advantages shall become clearer from the description of a preferred embodiment, but not exclusively, of the press machine according to the present invention and of its use in the production process of dairy products, particularly of mozzarellas and the like, particularly for producing mozzarellas having a substantially two-dimensional geometry, for example disc-shaped, illustrated also as an indication and not for limiting purposes with the aid of the following Figures.

DESCRIPTION OF THE FIGURES

FIG. 4 is a top side view, in enlarged scale and partially sectioned of a portion of the pressing element represented in FIG. 4 coming towards the alveolar plane.

FIG. 5 is a top side view in enlarged scale and partially sectioned of a portion of the pressing element represented in FIG. 4 arranged in its pressing position.

DETAILED DESCRIPTION OF THE INVENTION

For the purposes of the present invention by "mozzarella having a substantially two-dimensional geometry" we mean a mozzarella that is substantially flat in which the thickness is for example of between 5 and 40 mm, preferably between 8 and 30 mm, even more preferably between 10 and 20 mm.

Figure 1:
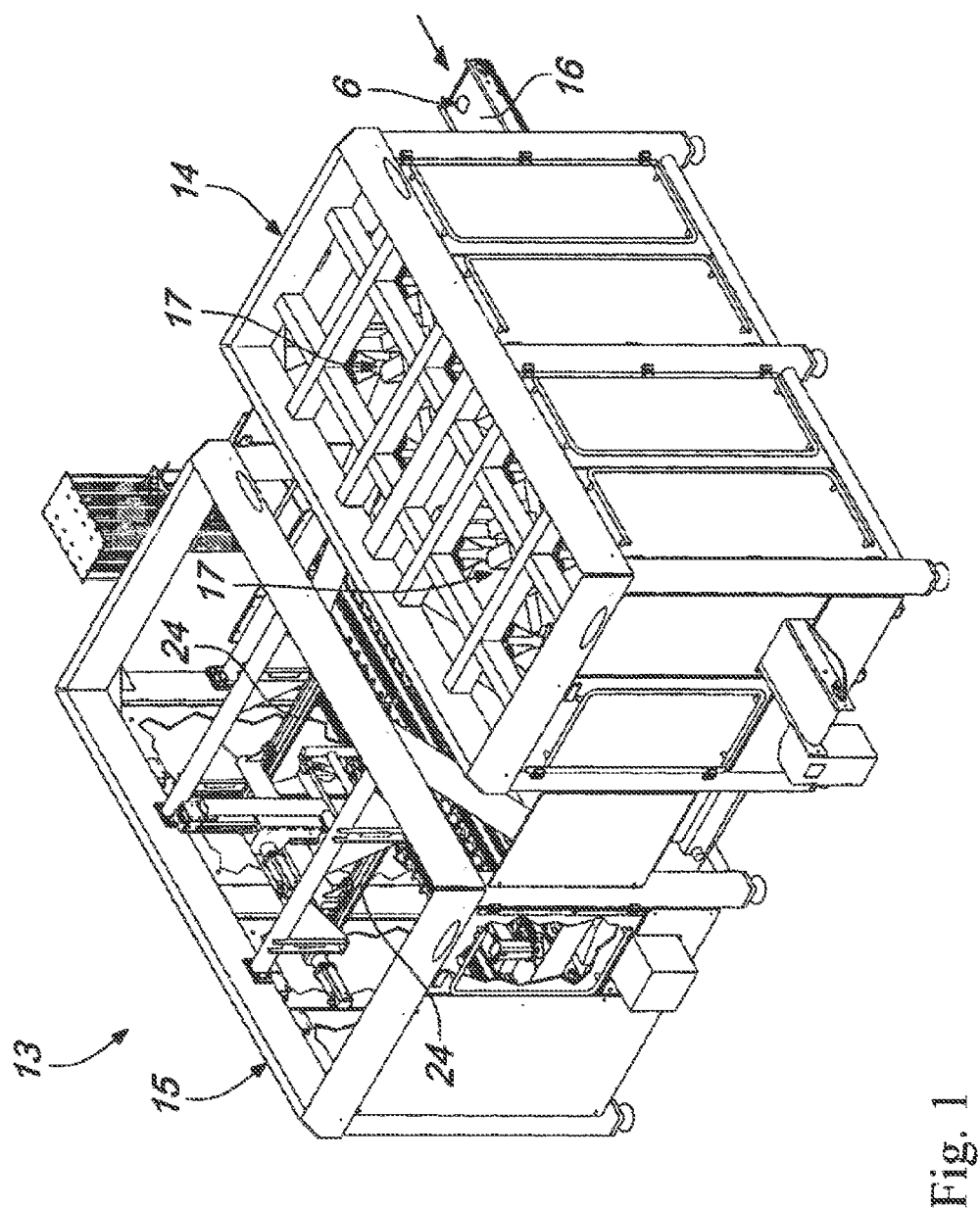
FIG. 1 is a perspective view of one embodiment of a press machine, particularly for producing mozzarellas having a substantially disc-shaped geometry, according to the present invention.

FIG. 1 represents an embodiment of a press machine 13, particularly for producing mozzarellas substantially having a disc-shaped geometry; comprising a station for sorting 14 preformed balls of mozzarella paste 6 and obtained with a milk-based paste and a press station 15 for shaping the preformed balls of mozzarella paste 6 in balls of mozzarella paste having a disc-shaped geometry 8.

More precisely, the sorting station 14 is crossed by a conveyor belt 16, which transports the preformed balls of mozzarella paste 6, which are taken by mechanical hands 17, to then be positioned on an alveolar plane 18 defined inside the press station 15.

Figure 2:
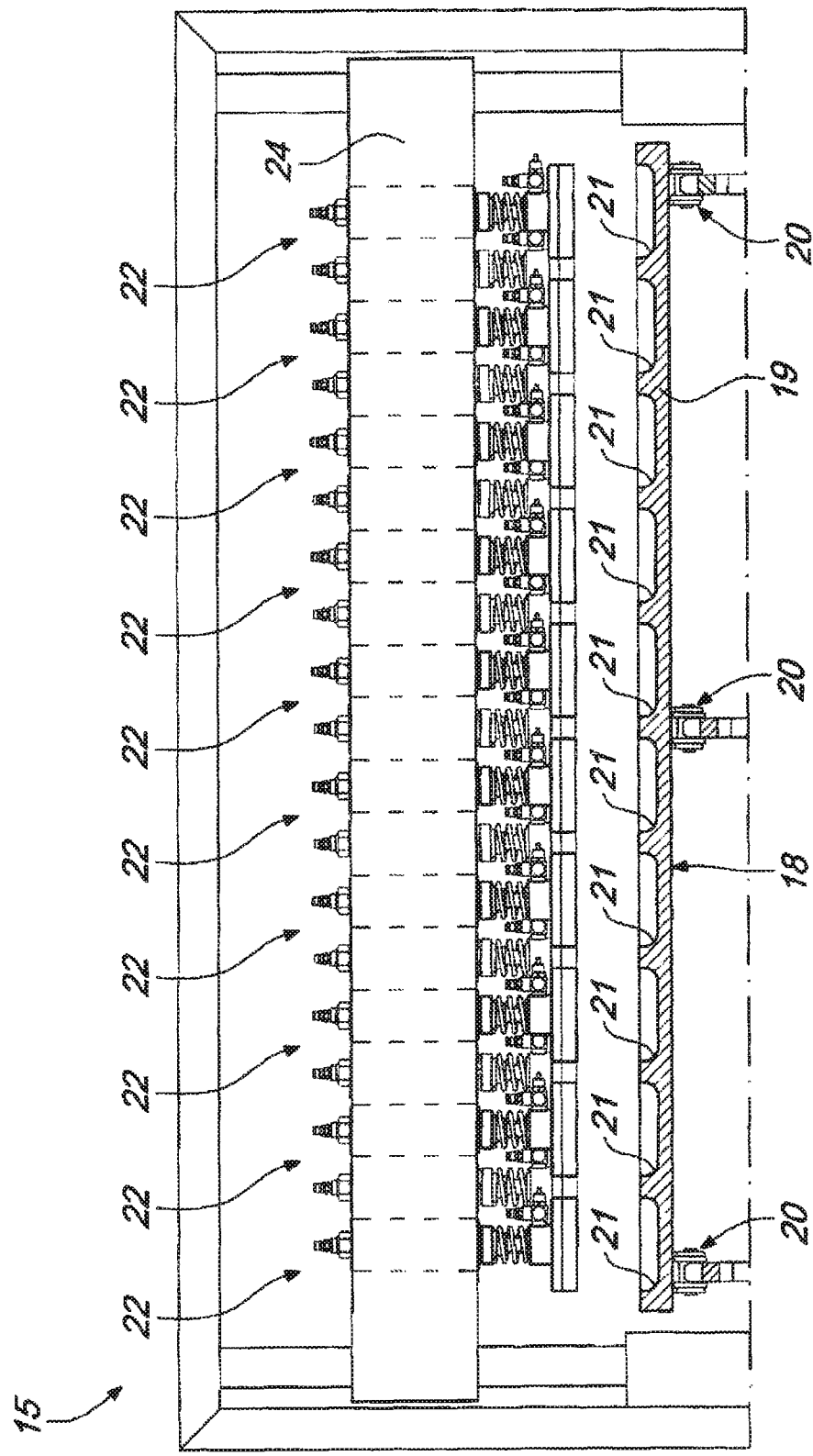
FIG. 2 is a top front view of the press station of the press machine represented in FIG. 2.

In FIG. 2 the alveolar plane 18 can be seen, made up of the container bodies 19, positioned on chains 20, responsible for their movement, and that each define one or more alveolar seats 21, suitable for containing one or more preformed balls of mozzarella paste 6 coming from the sorting station 14.

As highlighted in FIG. 2 each alveolar seat 21 also foresees at least one pressing element 22 that is mobile between a resting position, in which the pressing element 22 is located distant from the alveolar plane 18 for positioning the preformed mozzarella balls 6 into the alveolar seats 21, and a pressing position, in which the pressing element 22 is located above the respective alveolar seat 21 for pressing the preformed ball of mozzarella 6.

The geometrical shape of the base of the alveolar seat 21 is what determines the final geometrical shape of the mozzarella. In the machine represented in the Figures it has a substantially circular shape, but it can have any other two-dimensional geometrical shape for example square, rectangular, heart-shaped etcetera.

Figure 7:
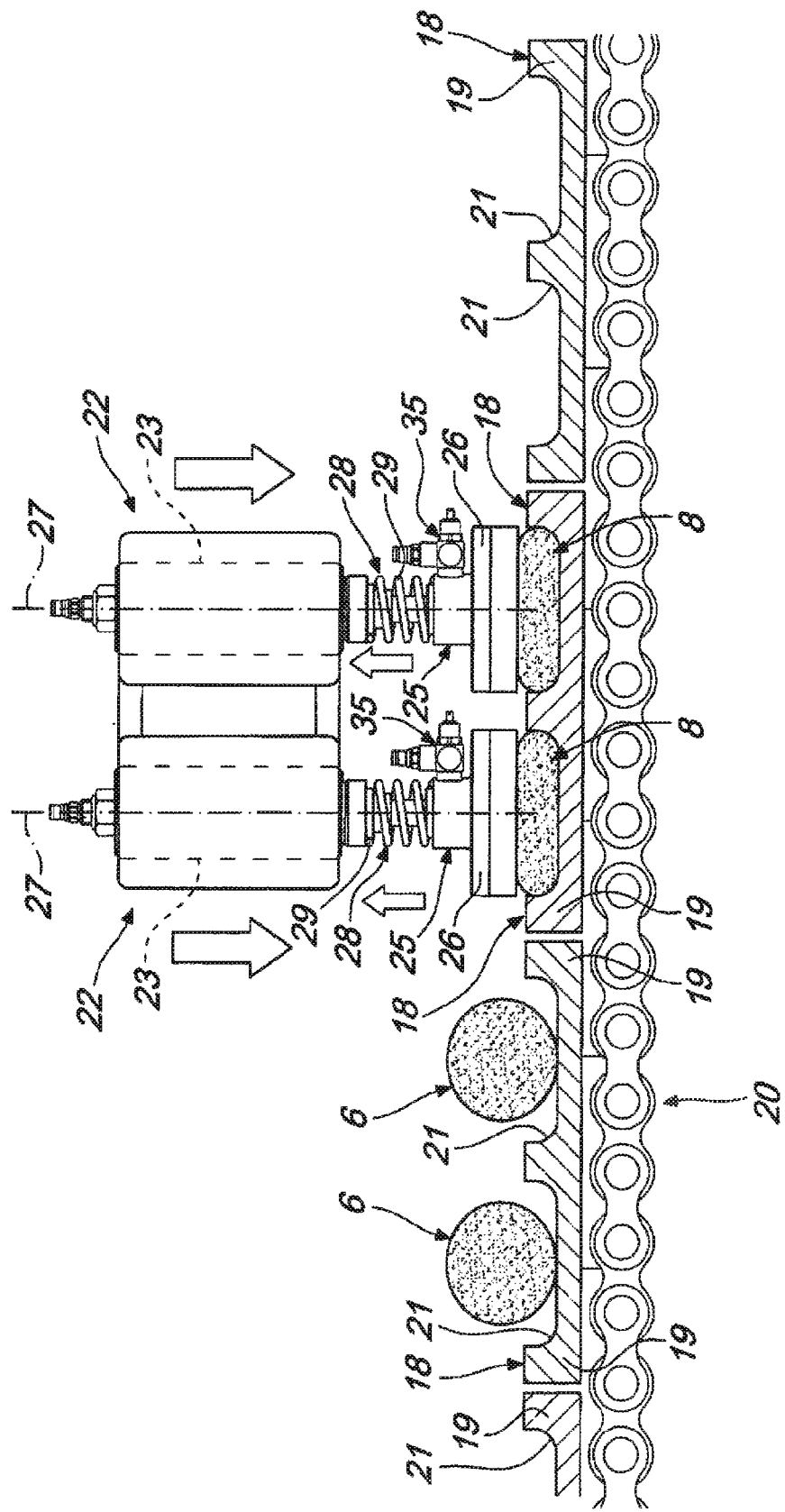
Figure 8:
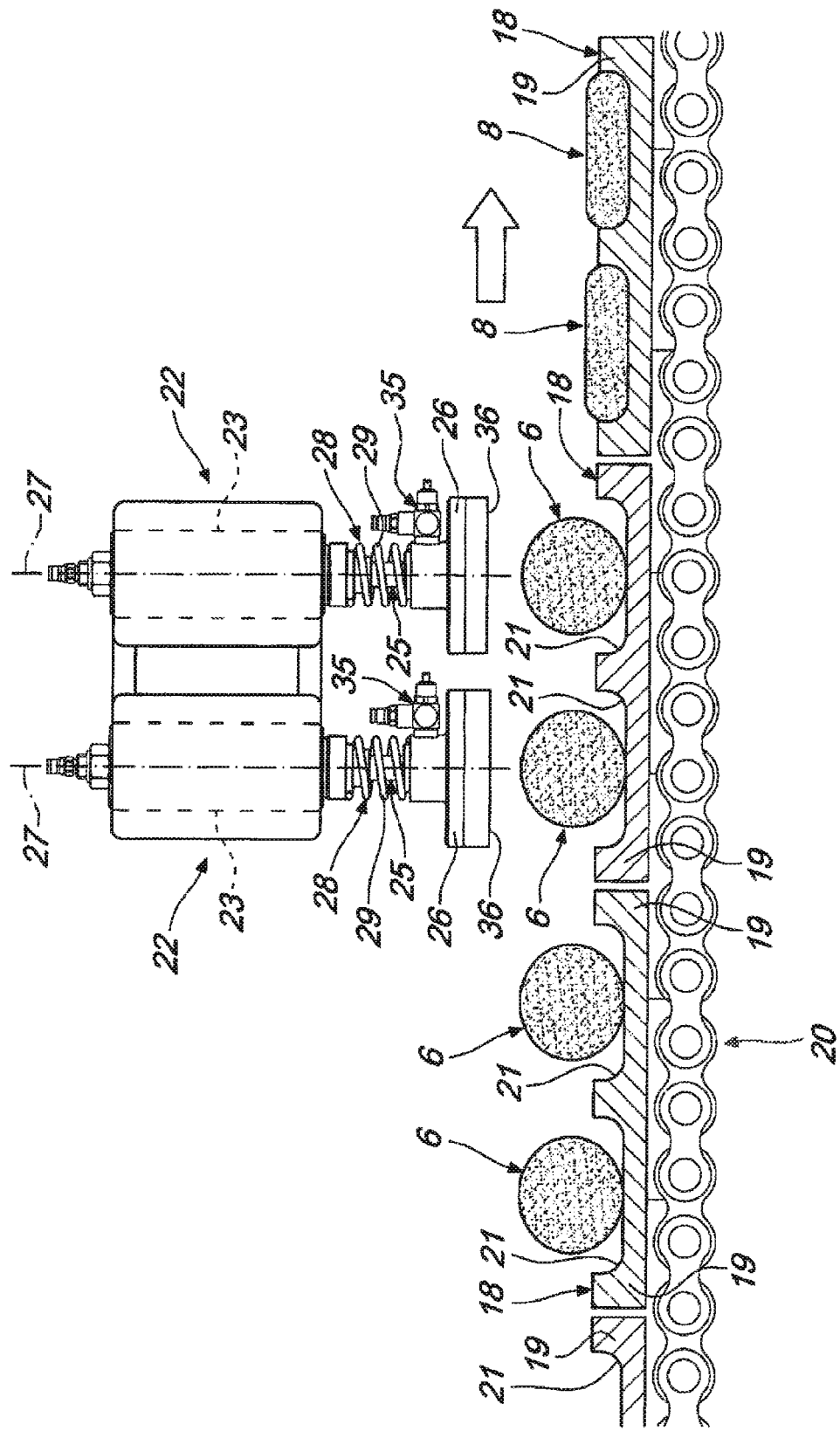

As can be seen in FIGS. 2-5, advantageously, the pressing element 22 comprises a substantially tube-shaped main body 23 that is fixed to a hoisting beam 24, located in the pressing station 15 and mobile, for moving the pressing elements 22 from the resting position represented in FIGS. 4 and 7 to the pressing position represented in the FIGS. 5 and 8 and vice versa.

More specifically, each pressing element 22 also comprises a piston 25 having a disc-shaped head 26, that is slidingly associated with the main body 23 along a pressing direction 27, in contrast and by action of elastic means 28 interposed between the main body 23 and the piston 25, for generating a constant pressing pressure, when the pressing element 22 is located in the pressing position substantially in contact with the preformed ball of mozzarella paste 6.

More precisely, the elastic means 28 comprise a helical spring 29 that is fitted on a stem 30 of the piston 25.

Advantageously, the helical spring 29 has a preload which can be adjusted according to the pressing force that is desired to be given to the preformed ball of mozzarella paste 6, for example, substantially equal to 40 kg.

Advantageously, the stem 30 is inserted inside a cavity 31 defined by the main body 23 and, between the same cavity 31 and the stem 30, there are scraping means 32 for isolating the cavity 31 from dirt and from residual food substances that can lead to the formation of bacteria colonies on and in the pressing element 22.

Figure 3:
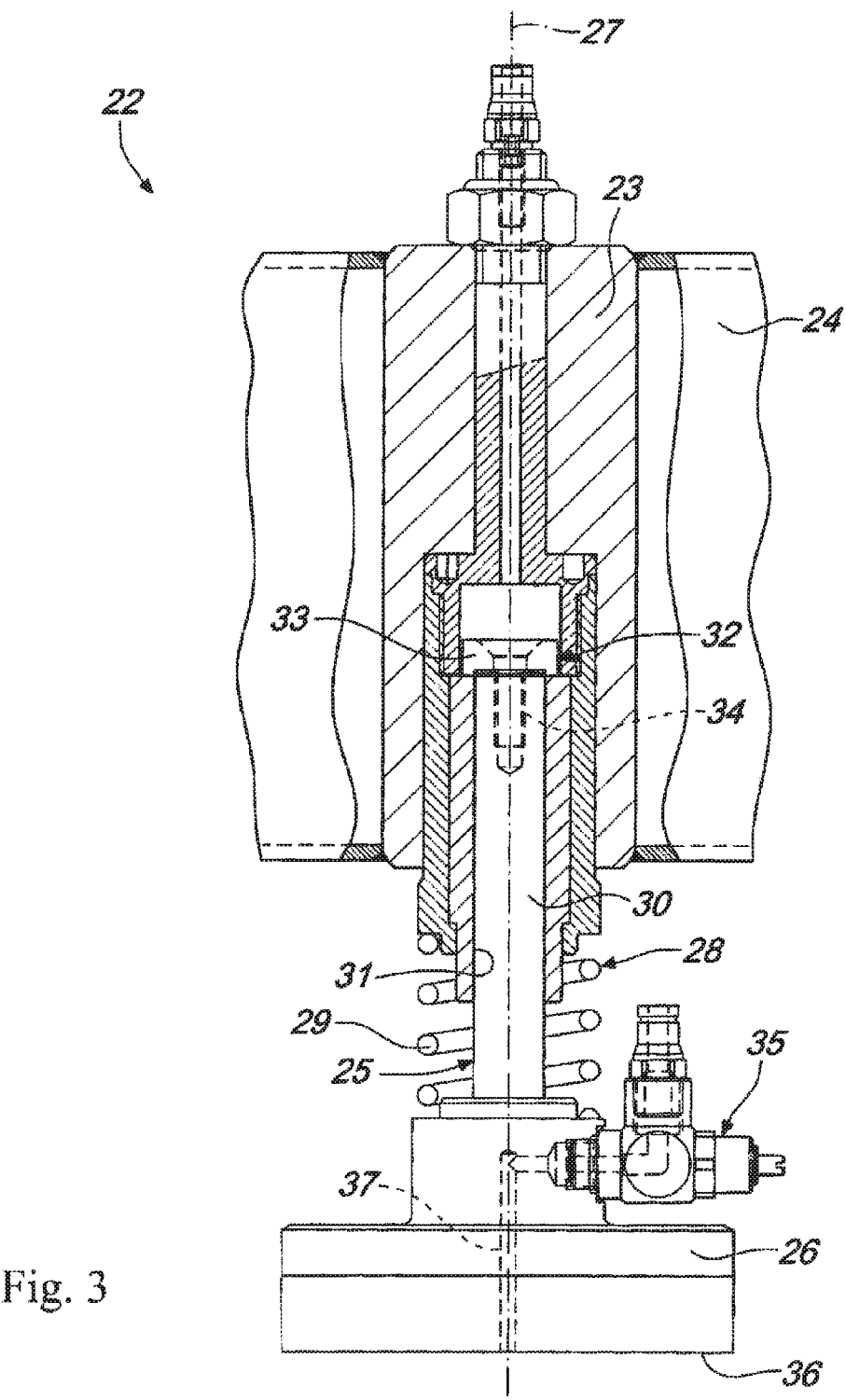
FIG. 3 is a top side view, in enlarged scale and partially sectioned of a pressing element of the press station represented in FIG. 2.
Figure 6:
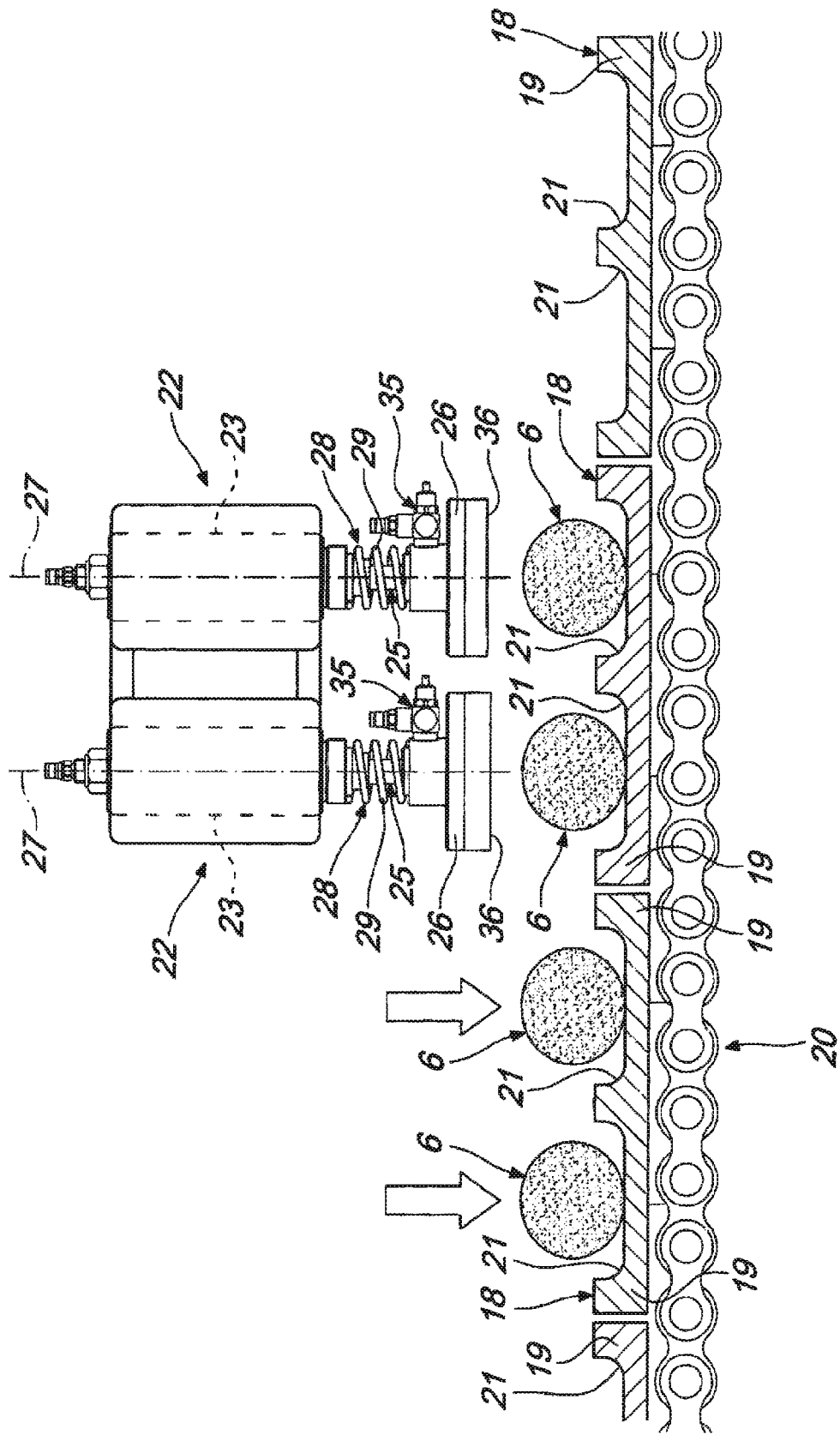
FIGS. 6, 7 and 8 illustrate in sequence the step of pressing the mozzarella balls, in the press machine according to the present invention.

In the proposed embodiment, with particular reference to FIG. 3, the scraping means 32 comprise a scraping ring 33 that is associated with the stem 30 and is inserted inside the cavity 31.

More precisely, the scraping ring 33 can translate as a unit to one of the stem 30 and the cavity 31. In FIG. 3, the scraping ring 33 is fixed to the stem 30 through a screw 34.

In addition, means for blowing sterile air 35 are foreseen, communicating with the contact surface 36 of the piston 25 through a passage channel 37, defined inside by the disc-shaped head 26 of the piston 25, for making a sterile air cushion 38, defined between the ball of mozzarella 6 and the contact surface 36 so as to prevent the ball of mozzarella 6 from sticking to the contact surface 36.

The operation of the press machine 13, particularly for producing mozzarellas having a substantially disc-shaped geometry, is as follows.

Once the preformed balls of mozzarella paste 6 have been arranged in the alveolar seats 21, the pressing element 22 is lowered placing the piston 25 in contact with the preformed ball of mozzarella 6.

During the pressing by the means for blowing sterile air 35 the sterile air cushion 38 is created preventing the preformed ball of mozzarella paste 6 from sticking to the piston 25.

The pressing pressure is adjusted by the pre-load of the helical spring 29 which, together with the pressing time, adjusts the thickness of the pieces of mozzarella, which in the specific case have a disc-shaped geometry 8, keeping the weight constant.

Figure 9:
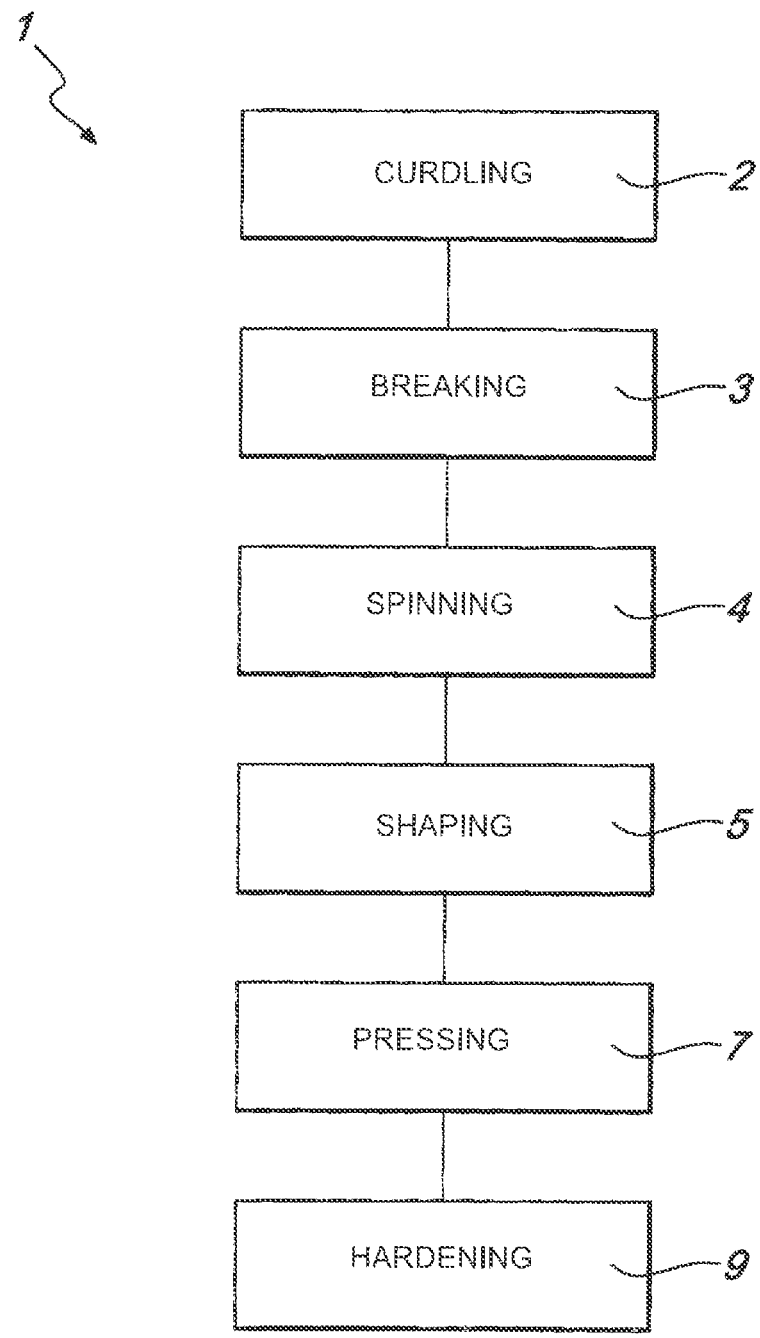
FIG. 9 is a block diagram representing one embodiment of a production process of dairy products, particularly of mozzarellas and the like, having a substantially disc-shaped geometry in which the pressing is carried out in the press machine according to the present invention.

The press machine can for example be used in the process for producing mozzarellas shown in FIG. 9.

In this figure the production process of dairy products, particularly of mozzarellas and the like, wholly indicated with reference numeral 1 in the represented block diagram, comprises a milk curdling step 2 followed by a step 3 of breaking the curd obtained in the curdling step 2 for making a curd having predetermined food and/or physical/chemical characteristics.

More precisely, the curdling step 2 and the breaking step 3 are per se known with the latter being carried out with the separation of the curd from the whey.

Following this, it is foreseen for there to be a step 4 of spinning the curd obtained with the curdling step 2 and with the breaking step 3 for the breakdown of the curd with the aid of hot water at a temperature of between 83° C. and 87° C., preferably equal to 85° C. so as to make a mozzarella paste having predetermined food and/or physical/chemical characteristics, necessary for forming the finished product.

Once the mozzarella paste has been obtained, there is then a step 5 of shaping it, for making preformed mozzarella balls 6 having a predetermined weight with the use of at least one pitted roll forming machine which cuts the balls of spun paste in a per se known manner.

The pressing step 7 carried out in the press machine object of the present invention of the balls of mozzarella 6, made for example with a cow's milk-based paste, makes it possible to obtain pieces of mozzarella, which in the specific case have a substantially disc-shaped geometry 8.

Figure 10:
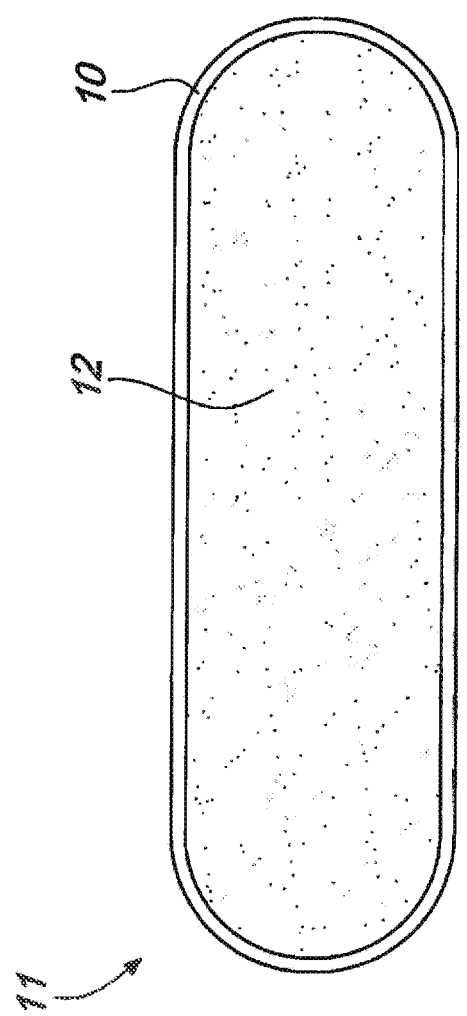
FIG. 10 is a schematic side view of a mozzarella having a shape that is substantially obtained according to the process described in FIG. 9.

Following the pressing step 7 it is foreseen for there to be at least one step 9 of hardening the pieces of mozzarella having a disc-shaped geometry 8 for forming on them an outer film 10 that is suitable for holding the internal juices and aroma as represented in FIG. 10.

More precisely the hardening step 9 is carried out by dipping in freezing water at temperatures of between 2° C. and 6° C., preferably equal to 4° C., such as to cause the thermal shock necessary for forming the outer film 10.

In such a way a mozzarella 11 is obtained having a substantially two-dimensional geometry in particular having a substantially disc-shaped geometry having a succulent inner structure 12, enclosed by the outer film 10, as represented in FIG. 10.

Here, with the term "mozzarella" we mean any milk product, like for example cow and buffalo milk mozzarellas, burrata and the like, as well as fresh cheeses in general having a succulent inner structure enclosed by an outer film.

In practice it has been seen that the mozzarella which can be obtained with this production process, involving the press machine used for making this mozzarella, achieves the task as well as the predetermined purposes since it is a fresh mozzarella, i.e. having a succulent inner structure enclosed by an outer film, which, thanks to its substantially two-dimensional configuration, is particularly suitable for being used in the preparation of "take away" products like panini and the like, without requiring cutting operation.

It should be understood that the press machine used for making this mozzarella, the relative production process that uses it and the mozzarella obtained with such a process thus conceived can undergo numerous modifications and variants all covered by the inventive concept.

Moreover, all the details can be replaced by technically equivalent elements.

In practice, the materials used, as long as they are compatible with the specific use, as well as the contingent dimensions and shapes can be any according to the requirements.

The invention claimed is:

1. Press machine for producing mozzarellas having a thickness between 5 and 40 mm, comprising a station for sorting preformed balls of mozzarella and obtained with a milk-based paste and a press station for shaping said preformed mozzarella balls into pieces of mozzarella having a thickness between 5 and 40 mm, said press station in turn comprising a plane defining at least one seat suitable for containing at least one of said preformed mozzarella balls and coming from said sorting station, also comprising at least one pressing element that is mobile between a resting position, in which said pressing element is located distant from said plane for arranging said preformed ball of mozzarella in said seat, and a pressing position, wherein said pressing element is located above said seat for pressing said preformed ball of mozzarella, wherein said pressing element comprises a main body fixed to a hoisting beam located in said press station and mobile for moving said pressing element from said resting position to said pressing position and vice versa, said pressing element also comprising a piston with a disc-shaped head slidingly associated with said main body along a pressing direction in contrast and by action of elastic means interposed between said main body and said piston for generating a constant pressing pressure with said pressing element located in said pressing position substantially in contact with said preformed ball of mozzarella.

2. Press machine according to claim 1, for producing mozzarellas having a substantially disc-shaped structure, wherein the base of the seat has a substantially circular geometry.

3. Press machine, according to claim 1, wherein said elastic means comprise a helical spring fitted on a stem of said piston, said helical spring having a pre-load substantially equal to 40 kg.

4. Press machine, according to claim 3, wherein said stem is inserted in a cavity defined by said main body, wherein between said cavity and said stem there are scraping means for isolating said cavity from dirt and from residual food substances that could lead to the formation of bacteria colonies on and in said pressing element.

5. Press machine, according to claim 4, wherein said scraping means comprise a scraping ring associated with said stem and inserted in said cavity, said scraping ring translating as a unit to one of said stem or said cavity.

6. Press machine, according to claim 1, wherein it comprises means for blowing sterile air, communicating with contact surface of said piston through a passage channel, defined inside said disc-shaped head, for making a sterile air cushion, defined between said ball of mozzarella and said contact surface, so as to prevent said ball of mozzarella from sticking to said contact surface.

7. Press machine, according to claim 1, wherein it comprises a plurality of pressing elements associated with said hoisting beam, and a plurality of seats defined by said plane for simultaneously making a plurality of mozzarella pieces having a thickness between 5 and 40 mm.

* * * * *